March 16, 1954

J. R. DAVEY 2,672,511

TELEGRAPH REPEATER

Filed May 31, 1951

2 Sheets-Sheet 1

INVENTOR
J.R. DAVEY
BY
John E. Cassidy
ATTORNEY

March 16, 1954 J. R. DAVEY 2,672,511

TELEGRAPH REPEATER

Filed May 31, 1951 2 Sheets-Sheet 2

INVENTOR
J.R. DAVEY
BY John E. Cassidy
ATTORNEY

Patented Mar. 16, 1954 2,672,511

UNITED STATES PATENT OFFICE 2,672,511

TELEGRAPH REPEATER

James R. Davey, Franklin Township, Somerset County, N. J., assignor to Bell Telephone Laboratories, Incorporated, New York, N. Y., a corporation of New York Application May 31, 1951, Serial No. 229,078

5 Claims. (Cl. 178—73)

This invention relates to telegraph systems and more particularly to a telegraph system in which a carrier telegraph circuit is interconnected through an electronic control circuit or coupling unit as it is otherwise known to a telegraph hub circuit.

Carrier telegraph circuits, electronic control circuits and telegraph hub circuits per se are well known in the art but circuit arrangements which provide for the interconnection of these units into an operable system, have not been heretofore known. Their introduction by eliminating the polar relays presently employed in the connecting repeater will make it possible to more fully realize the advantages inherent in electronically controlled hub telegraph repeater systems, particularly their speed of operation, relative freedom from bias, and reduction in maintenance.

The invention may be understood from the following description when read with reference to the associated drawings in which.

Figure 1:
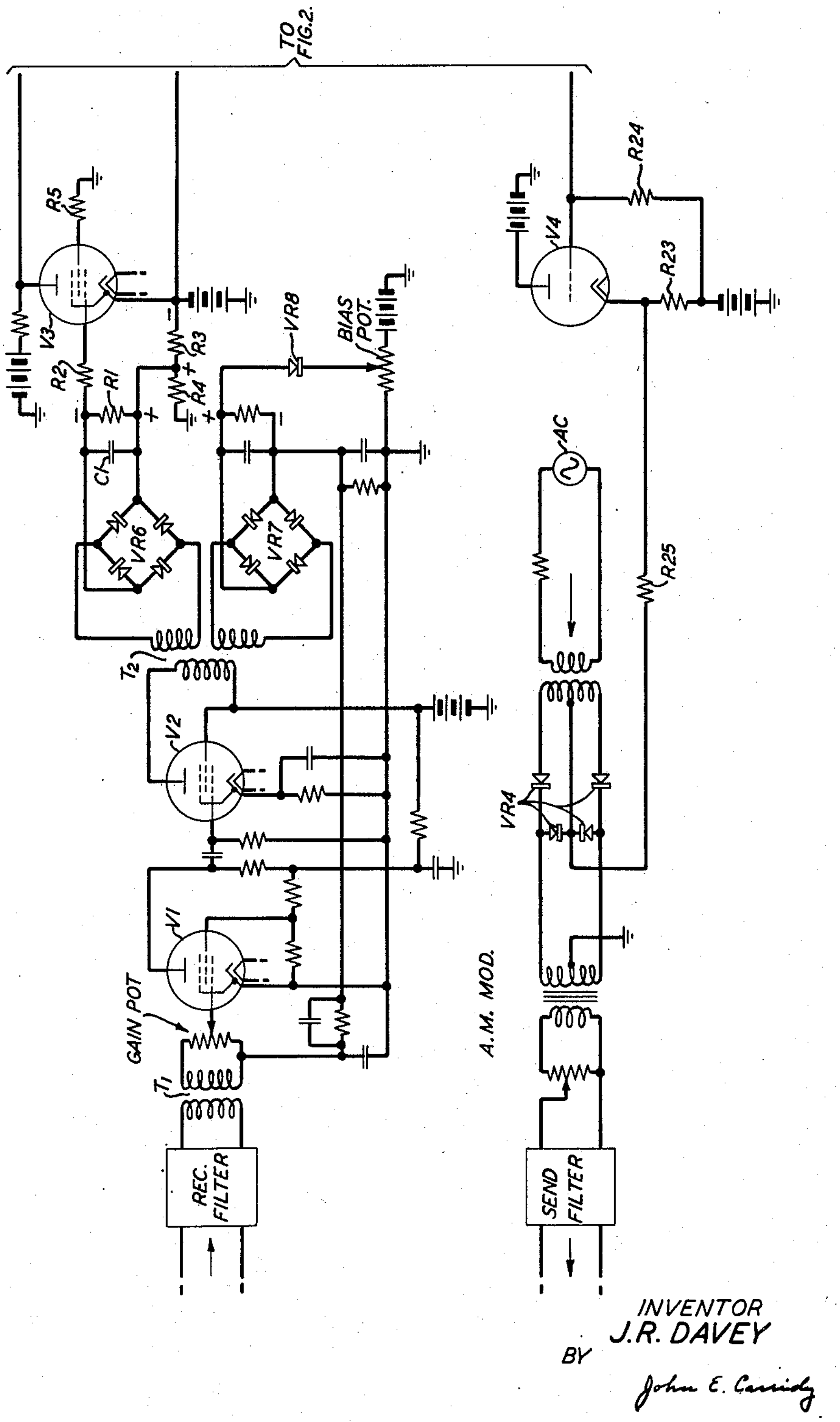
Fig. 1 shows a carrier telegraph circuit comprising an incoming or receiving branch and an outgoing or transmitting branch in the upper and lower portions of the figure, respectively.
Figures 2, 3:
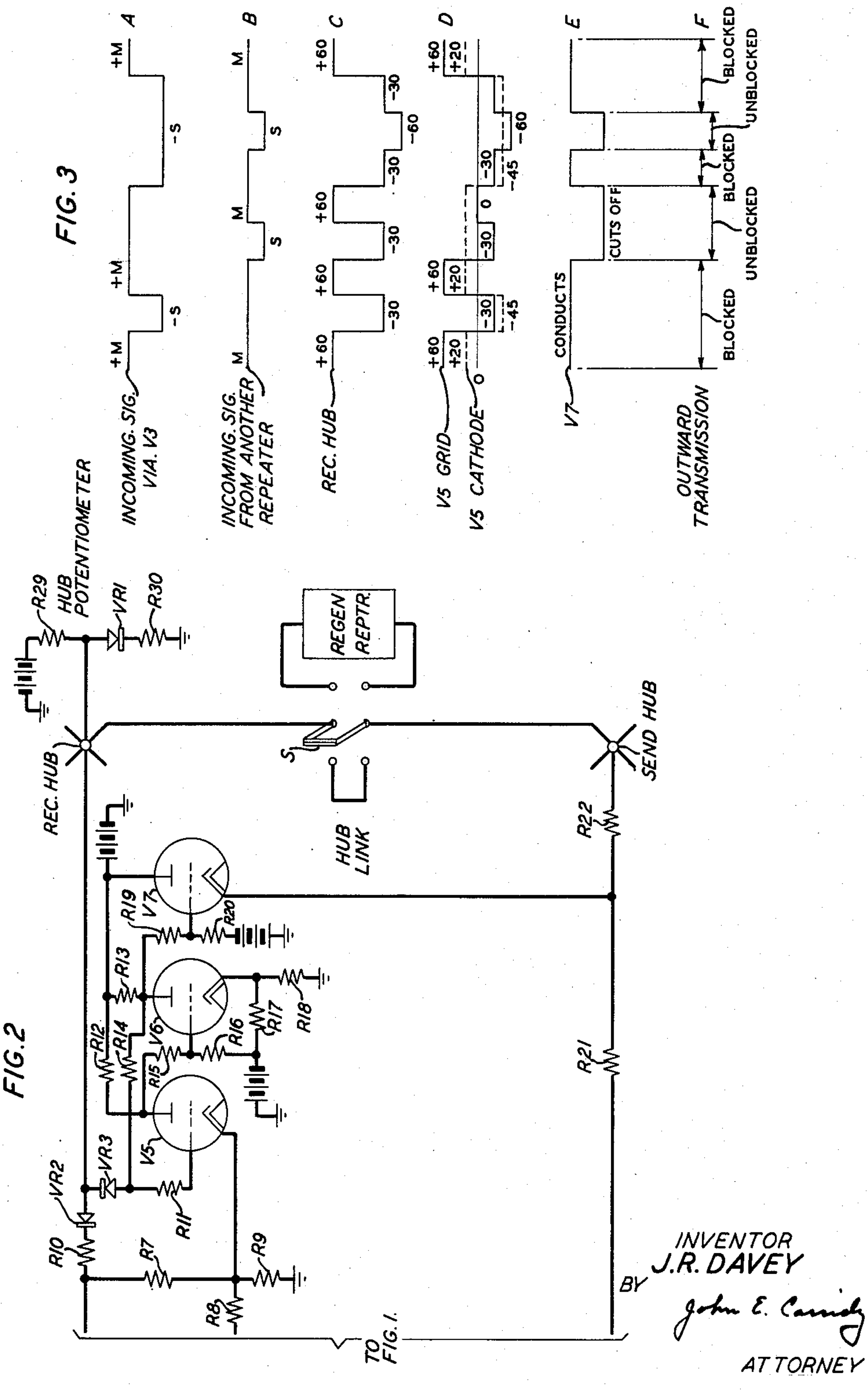
Fig. 2 shows an electronic control circuit, or coupling unit connected to a telegraph hub circuit at the right of the figure.
Fig. 3 is a diagram used in explaining the invention.

Refer now to Figs. 1 and 2.

In the following detailed description where values of constants are cited it is understood that the cited values are by way of example.

In hub telegraph systems, as is well known, a number of telegraph circuits, such as ten or more or less, are connected together through what is electrically a single point or hub. Any one of the circuits may transmit through the hub to all of the others simultaneously. Only one may transmit effectively at a time. In this instance the single circuit which is shown connected to the hub is a carrier telegraph circuit, shown in Fig. 1, comprising a branch at the top which transmits toward the hub and a branch at the bottom which transmits from the hub. The branches are shown interconnected in Fig. 2 through an individual electronic coupling circuit, one of which is required for each two-way circuit connected to the hub, the function of which is to control flow of signals through the lower or sending branch in response to signal conditions impressed on the receiving hub. The hub is shown at the right in Fig. 2. A regenerative repeater, if required, may be inserted in the connection between the receiving hub, to which the receiving or incoming branch from each of the individual circuits is connected and the sending hub, to which each of the individual sending branches is connected. If the regenerative repeater is not required the receiving hub and the sending hub are interconnected directly through the hub link through the operation of the double pole-double throw hub switch S in Fig. 2, which in one closed position inserts the regenerative repeater between the receiving and sending hubs and in the alternate closed position inserts the hub link, so that the receiving hub and sending hub electrically constitute a single point or hub. A hub potentiometer is shown at the upper right connected to the receiving hub. The hub potentiometer comprises a circuit extending from battery through a first resistance element R29, a rectifier element or polarity sensitive resistance VR1 and a second resistance R30 to ground. A connection is made between the receiving hub and the junction between resistance R29 and the rectifier VR1. The function of the hub potentiometer is to aid in obtaining desired potential swings on the receiving hub so as to afford discrimination between the different signaling conditions.

Carrier signals of a particular frequency, modulated with telegraph signals and incoming from the distant repeater, are separated from modulated carrier signals of different frequencies in the receiving filter, Rec filter, and are then impressed through the transformer T1 and the amplifier tubes V1 and V2 on the primary of transformer T2, the secondary of which has two windings, each operating into an individual full wave rectifier bridge. The lower bridge VR7 is connected through rectifier VR8, to provide the automatic gain control voltage, to the adjustable arm of a potentiometer, one end of which is connected through positive battery to ground and the opposite end of which is connected to the input of the first amplifier tube V1 to provide means for regulating the bias of the received signals.

The output of the upper full wave rectifier bridge circuit VR6 is connected to the input of the carrier receiving circuit branch output tube V3.

In the idle or steady marking conditions carrier is transmitted. The rectified carrier appearing across R1 and C1 applies a negative voltage to the control grid of tube V3 which overcomes the positive biasing voltage across R4 and maintains V3 in a cut-off condition. The receiver hub is held at a potential of +60 volts by the hub potentiometer. The potential at the plate of V3 is more positive than +60, consequently varistor VR2 is biased in the reverse direction and no appreciable current flows through it thus effectively isolating V3 from the receive hub.

The receive hub is connected to the send hub either directly through the hub link or through a regenerative repeater thus placing a +60-volt working potential on the send hub. This +60-volt potential is applied to the grid of V4 via potential divider comprising resistors R22—R21—R24 to —130 volts or equivalent lumped impedances to produce a potential of about +35 volts at the cathode of V4. A positive voltage applied through resistor R25 to varistor network VR4 permits the send carrier from the alternating current source A. C. to pass out to the distant carrier terminal.

For the spacing condition the carrier is cut off. With no carrier received during a space no rectified voltage appears across R1 and the positive bias voltage across R4 is applied to the grid of V3 via R2 and V3 is held conducting. The potential of the plate of V3 becomes negative, approximately 105 volts, and a current of 30 milliamperes flows from +130 volts through R29 of the hub potentiometer, VR2, and R10 to the plate of V3. This produces the spacing receive hub voltage of —30 volts. This spacing voltage is transmitted to the send hub via the hub link or the regenerative repeater. A space signal is thus sent to all other repeaters connected to the sending hub but as explained later the spacing voltage is prevented from reaching V4 of this circuit which originated the space. A marking condition is therefore still maintained toward the distant carrier terminal.

If another connecting repeater transmits a space to the receive hub, a current of 30 milliamperes is drawn from the hub potentiometer by that repeater and a spacing signal of —30 volts is produced. This is passed to the sending hub and is allowed to pass to the grid of V4 via divider R22—R21—R24. The cathode of V4 thus assumes a potential of about —35 volts. This negative voltage is applied to the varistor network VR4 and causes a high attenuation to the send carrier thus effectively interrupting the carrier. A spacing condition is thus transmitted to the distant carrier terminal.

The manner in which the control tubes V5, V6 and V7 operate is as follows:

The cathode of V5 is driven by the plate potential of V3 which is a high positive value for mark and a high negative value for space. Coupling network R7, R8, R9 furnishes V5 cathode potentials of +20 volts mark and —45 volts space. The grid of V5 is jointly controlled by the plate potential of V6 through R14 and by the receive hub potential through VR3. Due to the rectifying property of VR3 the more negative of these two sources becomes the controlling one. Tube V6 has its grid coupled to the plate of V5 by divider R15—R16 so that V6, with respect to activation, assumes the opposite condition of V5.

For transmission from V3 toward the hub, V5 conducts continuously and V6 is held cut off. The resulting high positive potential at the plate of V6 is coupled to the grid of V7 via divider R19—R20. This divider is arranged to give a voltage at the grid of V7 near to the normal marking voltage at the junction of R21 and R22. The cathode of V7 is thus prevented from falling in potential when the spaces occur on the send hub and V4 is held in the marking condition.

For transmission from some other repeater, V5 is held cut off continuously and V6 conducts. The resulting low potential at the plate of V6 places a negative voltage on the grid of V7 such that it remains cut off even for a space on the send hub and thus transmission is free to pass to V4 and thence to the modulator.

If during a space from V3 to the hub a space from another repeater is also applied to the receive hub, a double space voltage of —60 volts occurs and tube V5 cuts off and in turn V7 cuts off and a space is permitted to pass outward. This is the so-called double space by-pass action which serves as an indication of the abnormal condition.

The signal conditions impressed on the grid-cathode of V5 and the effect on V7 and on outward transmission are shown graphically in Fig. 3, diagrams A to F.

The flip-flop action of V5 and V6 is such as to maintain the state set up by the last space which was transmitted. This allows for the delay time through the regenerative repeater. That is, if an incoming space requires outgoing transmission to be blocked, that condition is maintained after the completion of the space until an unblocked condition is called for. Then that condition is maintained until a blocked condition is again required. When V6 is conducting the low potential at the plate is near zero. The grid of V5 is thus held near zero after the hub returns to +60 volts due to the non-conduction of VR3. In other words as pointed out before the more negative potential of the V6 plate controls the grid.

Full duplex service may be provided by disabling the operation of the flip-flop circuit. For instance opening the cathode connection to tube V7 permits outward transmission from the send hub without regard to the condition of the receive hub. Alternatively the receive hub potentiometer may be arranged to give mark and space potentials on the receive hub such that the flip-flop always remains in the state which permits outward flow of signals from the send hub. In full duplex service the receive and send hub points are kept separate since the sending and receiving branches are separate and independent transmission paths.

What is claimed is:

1. A telegraph system comprising a carrier telegraph circuit having a carrier current receiving branch and a carrier current sending branch operably connected to a direct-current telegraph hub and a transmission direction control circuit interconnecting said branches, to regulate the transmission of signals from said hub through said sending branch, in response to signal potential conditions impressed on said hub.

2. A telegraph system having a carrier receiving branch connected to a direct-current telegraph hub, a carrier sending branch connected to said hub and an electronic coupling circuit interconnecting said sending branch and said receiving branch to control the transmission of signals through said sending branch responsive to signals impressed on said receiving branch and on said hub.

3. A telegraph system having a hub, an incoming carrier branch connected through a first rectifier to the input of a space discharge device, an output of said space discharge device connected through a second rectifier to said hub, a branch outgoing from said hub comprising an input circuit of a second space discharge device connected through a lumped impedance to said hub, said second device responsive to potentials impressed on said hub through said receiving branch, a carrier current sending circuit, a connection from the output of said second device to said sending circuit, said sending circuit responsive to the output of said second device.

4. A telegraph system having a hub, an alternating-current telegraph signal receiving branch connected to said hub, a transmission direction control circuit connected to said receiving branch, a sending branch connected to said hub, an alternating current transmitting source connected to a carrier transmitting branch, a space discharge control in said sending branch intermediate said hub and said source for controlling the effective connection of said source to said transmitting branch and a connection from said transmission direction control circuit to said sending branch, said connection including potential controls for regulating transmission through said sending branch incident to transmission through said receiving branch.

5. In a telegraph system, a telegraph hub, a hub receiving branch and a hub sending branch connected to said hub, a carrier telegraph circuit, a receiving branch in said carrier circuit connected to said hub receiving branch, a sending branch in said carrier circuit connected to said hub sending branch and a transmission direction control circuit interconnecting said branches, said direction control circuit having potential controls for regulating transmission of carrier signals in said sending branch incident to carrier signals in said receiving branch.

JAMES R. DAVEY.

References Cited in the file of this patent

UNITED STATES PATENTS

| Number | Name | Date |
|---|---|---|
| 2,045,735 | Taylor | June 30, 1936 |
| 2,558,197 | Rea | June 26, 1951 |